United States Patent [19]

Ng et al.

[11] 3,774,243
[45] Nov. 27, 1973

[54] IMPLANTABLE POWER SYSTEM FOR AN ARTIFICIAL HEART

[76] Inventors: Daniel Y. C. Ng, Chicago; Sidney K. Wolfson, Jr., Highland Park; Anthony J. Appleby, Chicago, all of Ill.

[22] Filed: Oct. 20, 1971

[21] Appl. No.: 191,058

Related U.S. Application Data

[62] Division of Ser. No. 857,321, Sept. 12, 1969.

[52] U.S. Cl. .................... 3/1, 3/DIG. 2, 128/419 P, 136/86 R, 136/86 DD, 136/86 F
[51] Int. Cl. ........................... A61f 1/24, A61n 1/36
[58] Field of Search ............................. 3/1, DIG. 2; 128/1 R, 214, DIG. 3, 419 P; 136/86 R–86 F

[56] References Cited
UNITED STATES PATENTS

| 2,917,751 | 12/1959 | Fry et al. .................................. 3/1 |
| 3,097,366 | 7/1963 | Winchell ................................... 3/1 |
| 3,379,191 | 4/1968 | Harvey ............................. 3/DIG. 2 |
| 3,434,162 | 3/1969 | Wolfe ............................... 3/DIG. 2 |

FOREIGN PATENTS OR APPLICATIONS 225,033   12/1958   Great Britain .................. 128/419 R

OTHER PUBLICATIONS

The Development of An Intrapericardial Cardias Replacement Phase II, by W. H. Burns et al., Transactions ASAIO, Vol. XII, 1966, pages 272–274.

*Primary Examiner*—Richard A. Gaudet
*Assistant Examiner*—Ronald L. Frinks
*Attorney*—Jacques M. Dulin

[57] ABSTRACT

An implantable hybrid power system for artificial hearts or pacemakers, which includes a fuel cell assembly air breathing cathode assembly, and method of operation of such system. In one system embodiment a storage battery is combined with a fuel cell for peak power requirements and for more nearly steady-state fuel cell operation. The fuel cell may have either an external anode fuel source, such as hydrogen or hydrazine, or utilize blood carbohydrates, such as glucose. Electrical output from the disclosed power system is used to power any desired type of artificial heart or pacemaker device.

25 Claims, 5 Drawing Figures

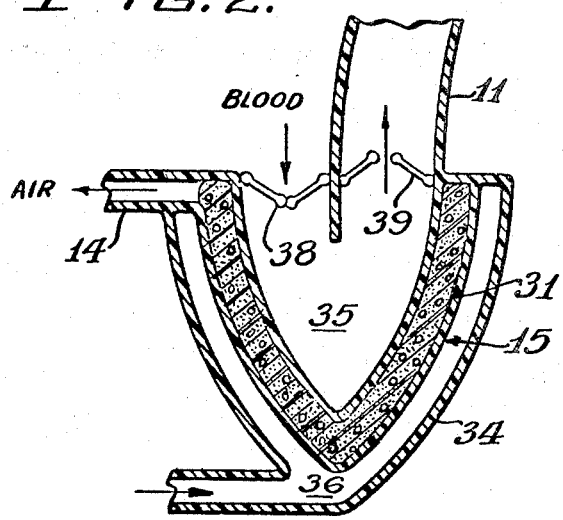
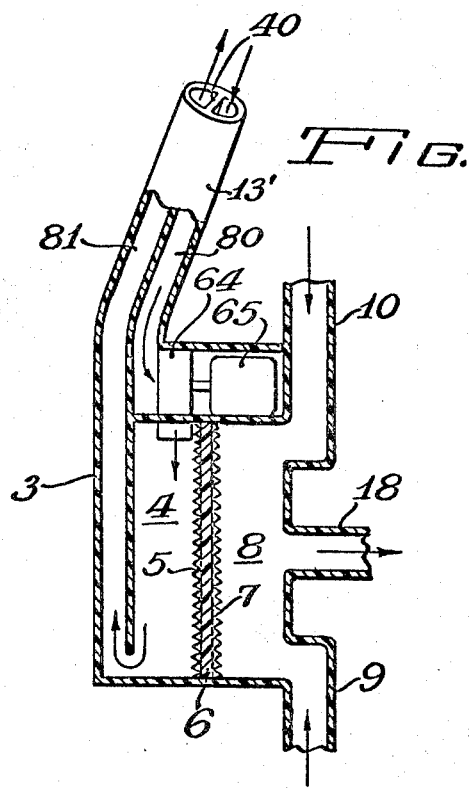

IMPLANTABLE POWER SYSTEM FOR AN ARTIFICIAL HEART

This application is a Division of our co-pending application, Ser. No. 857,321, filed Sept. 12, 1969, and is related to our co-pending application Ser. No. 857,322 filed of even date there-with for "Implantable Fuel Cell."

BACKGROUND OF THE INVENTION

1. Field of the Invention

The field of this invention deals with implantable hybrid power source systems for all types of implanted prosthetic devices, particularly artificial hearts and pacemakers, including both the systems themselves and their methods of operation. More specifically, the power source system of this invention employs a fuel cell which may have an air-breathing cathode assembly as in our parent application Ser. No. 857,321, filed Sept. 12, 1969. The fuel cell may be employed in combination with a storage battery for peak power requirements and for more nearly steady-state fuel cell operation hence the term "hybrid system." The fuel cell may have either an external anode fuel source, such as hydrogen or hydrazine, or utilize blood carbohydrates, such as glucose.

The need for artificial hearts is highlighted by the estimate that 14.6 million adults suffer from cardiac disease, and nearly as many are suspected to have heart disease. Of these, about one-half million persons can be considered to be a candidate for an artificial heart device. While an ultimate solution to heart disease may be dietary or pharmacological, the variety of types of heart diseases, the lack of biological uniformity of individuals, and the problem of drug side effects points to artificial hearts as at least an intermediate solution. Because of the rejection phenomena, transplants have not proven to be particularly successful as even an intermediate solution to heart disease. Depending, of course, on the progress of biochemical and medical science, and the availability of donors (human or non-human), artificial hearts may also be a long-range solution to heart disease.

2. Background of the Prior Art

An artificial heart system may be considered to be made up of two major parts: 1) an artificial heart pump circulation system, referred to hereinafter simply as a "pump," and 2) the power source for operation of the pump, and the attendant control systems.

1. The Pump

Our invention is directed to the second major part, the power source itself, and the power source in combination with any suitable pump either directly electrically driven or having an electric "motor" as the motive source for the actual pumping mechanism. Any of the prior art pumps, suitable for implantation and electrically operable, may be used in conjunction with our power source.

2. The Power Source

When emergency and temporary circulatory assist devices are applied to hospitalized patients, external power sources are permissible. However, for permanent, left ventricular assist devices or total heart replacement devices in ambulatory patients, total implantability is an important prerequisite to permitting the patient to lead a reasonably normal and gainful life.

Many modes of power sources have been suggested, including storage batteries, nuclear isotope powered "prime movers," and fuel cells. For example, in two Fry et al, patents, numbers 2,917,751 and 3,152,340, a battery powers an electric motor which in turn mechanically actuates a bellows-type heart pump. However, only the pump and motor are implanted, the battery being strapped to the thigh and connected to leads routed from the thigh through the body to the motor-pump in the thoracic cavity. Such leads are frequently associated with infection or deterioration of the epidermal opening through which they pass, and the external battery bulk is a hindrance to movement and clothing. A totally implantable radioisotope power source is disclosed in U.S. Pat. No. 3,379,191 to Harvey. The heat from the radioisotope energizes a miniature, closed-cycle steam engine which has a condenser, feed water pump, heart dissipation system, and related controls. A recent estimate of the development costs for a radioisotope power source, including attendant shielding problems, is on the order of $6 million. A molten LiH heat source for an implanted steam engine operating a silastic sac-type heart pump is proposed in U.S. Pat. No. 3,434,162 to Wolf. In this patent, the lithium hydride is rendered molten by periodic electrical heating. An electromagnetic induction coil system is used to transmit power through the skin from an external electrical power source. The patent estimates that it would take from 5 to 8 hours to recharge (reheat the lithium hydride) during each 24 hour cycle.

The possibility of a fuel cell power source for a mechanical heart was mentioned in passing by W. Lillehi in an article titled "In 10 Years — A Mechanical Heart / In 2 - 5 Years — Heart Transplants" appearing in Medical News Vol. 183, No. 12, pages 23–24. Somewhat later, a research feasibility study on an implantable fuel cell for an artificial heart was undertaken by R. F. Drake et al of Monsanto Research Corp. reported in a "First Annual Summary Report" and a "Second Annual Summary Report" on an "Implantable Fuel Cell For An Artificial Heart," dated Feb. 15, 1968 and July 10, 1968, under Public Health Contract number PH43-66-976 (available through the Clearing House, Springfield, Virginia 22151 as documents PB177695 and PB182591). A serious drawback to such a fuel cell power source lies in the fact that operation is proposed at around neutral electrolyte pH, in contrast to highly alkaline or highly acidic fuel cells for ordinary uses.

System analysis has shown that the power demand of the heart of a normal adult consists of an average 2 watts interspersed by peaks of up to 4 watts. The power source of a total replacement artificial heart must be designed to handle such a duty cycle, i.e., change in power demand, so that the patient can lead a normal life. But, as a result of neutral pH operation, the proposed fuel cell could respond only very slowly to changes in power demand, the lag time in some circumstances being obviously fatal. One solution is to operate the fuel cell at above peak power, but size, output, and heat rejection problems rule this out as a practical approach.

While use of a hybrid system has been proposed for an implantable power source, it has been suggested only in connection with the use of a lithium fluoride-lithium chloride eutectic as a thermal energy source in combination with a radioisotope-"prime mover" power source by Huffman et al "Design Of An Implantable, Rankine-Cycle, Radioisotope Power Source," at the Inter Society Energy Conversion Engineering Conference at Miami Beach, Florida, Aug. 13-17, 1967.

THE INVENTION

Objects

It is among the objects of our invention to provide an implantable fuel cell power source system for any type of electrically driven heart pump or pacemaker device that overcomes the objections and disadvantages of proposed prior art fuel cells.

It is another object of our invention to provide a balloon or blower - type of mechanism for cathode ventilation, i.e., for effecting air movement into and out of the cathode chamber.

It is another object of our invention to provide a hybrid power system and method of operation which employs the fuel cell of this invention in combination with a battery power source for peak power requirements, reduced fuel cell size, and more nearly steady state fuel cell operation.

It is another object of our invention to provide a hybrid power system that has a high redundancy capability, that is, which provides an adequate margin of life-support safety in the event of failure of either power component, the fuel cell or battery, alone.

It is another object of our invention to use our power source system either in terms of the fuel cell alone, or the hybrid system, in combination with any type of heart pump in an integrated, self-contained implantable system for use as a heart prosthesis.

Still further objects of our invention will be evident from the des-cription which follows.

SUMMARY

Our invention involves a hybrid power system in which the electrical energy producing device (fuel cell) is combined with an electrical energy storage device. In our hybrid power system, a fuel cell is combined with a storage battery, preferably of the silver-cadmium or nickel-cadmium type. Thus, our hybrid system contains two independent power supplies, each of which is selected to be capable of powering the blood pump alone. This important feature gives the fuel cell-storage battery hybrid system an outstanding redundancy capability. In the case of failure of the main fuel cell unit, the storage battery will provide sufficient power to operate the blood pump until the patient can be safely transferred to a hospital for emergency replacement of the fuel cell. While the safety time depends in part upon the battery capacity and the activity of the patient, the capacity of presently available batteries will not be exceeded by a safety time of up to 10 hours. Conversely, in the event of the failure of the battery, the patient can survive indefinitely on the fuel cell alone by refraining from only those activities which require peak power.

Our hybrid system also provides an improved peak power capability and efficiency of the system. The fuel cell reliability and life is increased since in a hybrid system the fuel cell can be permitted to operate within a narrow band of power output thus more nearly approximating steady state conditions. During normal demand, the fuel cell powers the blood pump and continuously recharges the storage battery. At peak demand almost all of the extra power is supplied by the battery while the fuel cell continues to operate at nearly a steady state.

Still other benefits of our hybrid system include increased efficiency and reduction of the fuel cell size both important in view of the limited volume available for implantation, particularly in small adults. Another advantage of the fuel cell-storage battery hybrid power source system is the fact that the hybrid is silent except for a normal type of "breathing" noise. Thus the hybrid does not have the psychological and physiological effects on the patient as in the case with vibration of a "prime mover" type of system such as a steam engine.

THE FIGURES

The invention is described in more detail below with reference to the following figures in which like elements are referred to with like numbers throughout.

FIG. 2 shows schematically the balloon incorporated as a portion of a sac-type heart involving a double-walled ventricle defining the balloon space within which is placed the open-pore sponge;

FIG. 3 shows schematically an embodiment in which the airbreathing cathode is not dependent on the balloon system and involves the use of a smaller rotor powered by the fuel cell to move air within the cathode through a two-channel duct to the skin pore;

Figure 4:
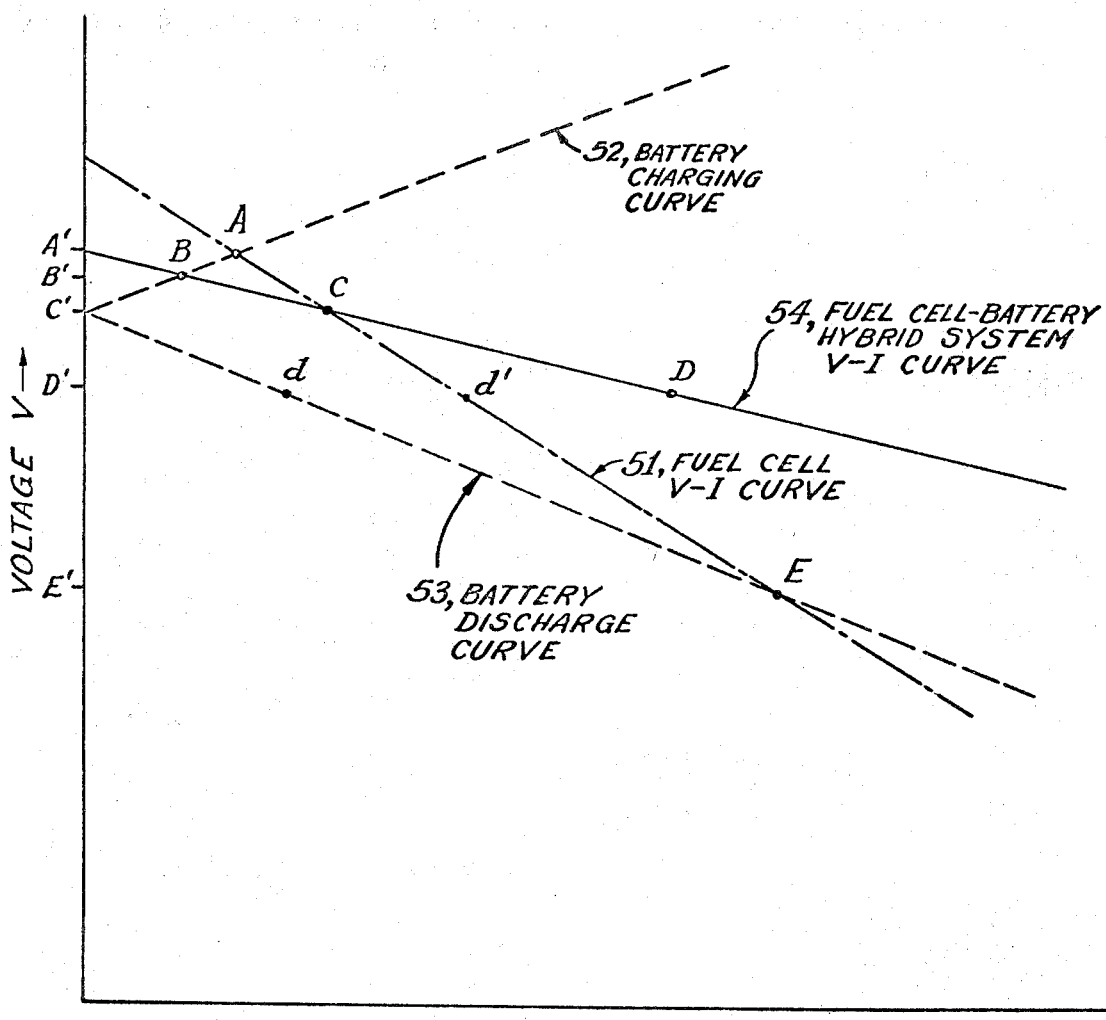
Figure 5:
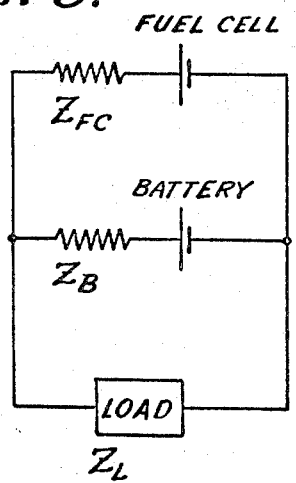

FIG. 4 graphically shows the voltage-current characteristics of the battery, the fuel cell and the hybrid system of this invention; and FIG. 5 shows schematically the electrical circuitry for the storage battery and fuel cell hybrid power system.

DETAILED DESCRIPTION

General System Specifications and Implantation Arrangement

As noted above, during a 24 hour living cycle the normal adult heart power demand is an average of 2 watts for continuous pumping power interspersed with peak loads of up to 4 watts. On the basis of conversion of the electrical power of the hybrid fuel cell-storage battery system to pumping power by a suitable pump as being 50 percent, Table 1 below outlines the basic specifications of our hybrid system:

TABLE 1

Implantable Hybrid Power Source Specifications

| Specification | Normal Load | Peak Load |
|---|---|---|
| System power output, watts | 4 | 8.5 |
| Fuel cell power output, watts | 4.5 | 4.5 |
| Battery power output, watts | | 4 |
| Fuel cell unit cell voltage, volts | 0.45 | 0.45 |
| Battery capacity watt hours | 10 | 10 |
| Fuel cell efficiency, per cent | 37.5 | |
| Overall system thermal efficiency, per cent | 16.6 | |
| Total heat loss, watts | 10 | |

Thus, our fuel cell operates at a constant output of 4.5 watts of which 4 watts are designated to be used to power the motor pump device at 50 percent conversion to give 2 watts continuous pumping power. The remaining 0.5 watts will continuously recharge the storage battery. The overall thermal efficiency of 16.6 percent for our hybrid system is comparable to the effiexpansion and contraction of the balloon thus assists in drawing air into the cathode chamber 4 and expelling it in a cycle equal to and in phase with the breathing rate of the patient.

In another embodiment, the balloon may be built into either or both of the left or right ventricles of a heart pump. In this embodiment, the heart pump utilizes a collapsible plastic ventricle such as have been used in the past in the pendulum-type heart pumps, the bellows type of pumps, or the sac-type of heart pumps. Referring now to FIG. 2, we prefer a sac-type heart pump, in which a relatively rigid outer casing 34 contains the balloon in the form of a double-walled ventricular sac 15. The casing and sac defines an inner ventricular sac space 35 and an outer pumping fluid space 36. The blood flows inwardly into the ventricular space 35 via the valve 38 (shown schematically) and exits on the power stroke through the valve 39 (likewise shown schematically). As the fluid comes from the pump via tube 37 into the pumping fluid space 36, the balloon-ventricular sack and sponge 31 are compressed forcing the blood out of the ventricular space 35 into the aorta 11 and the collapse of the balloon 15 causes the air to exit out of tube 14, which as before is connected to the cathode chamber 4. Thus, as the ventricular space 35 alternately fills and empties, the pumping action simultaneously pumps the blood and the air from the air-breathing cathode.

In this embodiment, the compliance of the sponge is such that it creates an internal pressure slightly greater than the maximum diastolic pressure of the ventricular filling phase. As the heart itself beats or pumps, it will move air in and out of the cathode chamber. Because of the very close proximity to the cathode where the fuel cell is closely integrated with this heart pump, the dead space is virtually zero and the volume of the air space in the ventricular wall need only be proportional to the amount of dead space in the duct leading from the cathode to the skin pore. In addition, the air circulation in this embodiment is synchronized directly to the heart pump rather than correlated to breathing.

BLOWER SYSTEM

FIG. 3 illustrates a further embodiment of the fuel cell utilizing an air-breathing cathode according to this invention, but which does not utilize the balloon type of air moving means. In this embodiment, a bifurcated tube 13', having a web or septum 40 leads down to the fuel cell 3 which has a cathode air space 4, a cathode surface 5, electrolyte 6, anode 7, and anode space 8 as described previously. This modification employs a suitable small fan 64, which in the embodiment illustrated in FIG. 3 is a squirrel-cage type of fan operated by motor 65. The air is drawn downwardly in the inlet half 80 of the tube 13' as shown by the arrow through the fan 64 and exits into the cathode air space 4. The positive pressure of the fan continues the air circulation thence upwardly through the exhaust half 81 of the tube to exit as shown by the arrow. At the same time, the blood is circulating from the inferior vena cava 9, the superior vena cava 10, through the anode space 8 and thence into the heart pump via conduit 18.

Since the cathode itself is located within the confines of the fuel cell-heart pump prosthesis, this small fan or turbine may be located in close proximity with, or be part of, the unitized construction of these elements, with the power output from the fuel cell or battery driving the fan. In addition, where the heart pump is driven by an electric motor, power takeoff from the single motor may be used to drive both the heart pump and the fan. The power requirement for this fan or turbine is minimal; it may be constructed to run continuously in a hermetically sealed unit with respect to bearings and lubrication. A typical flow rate for the air would be one which provides approximately 0.6 cc. ±10 percent per second of oxygen to the cathode air space.

FIG. 4 shows graphically the voltage-ampere characteristic curves of the system and of its component parts. Curve 51 is the curve of the discharge of the fuel cell; curve 52 is the characteristic battery charging curve; curve 53 is the battery discharge curve, which is the mirror image of curve 52; and curve 54 is the hybrid system voltage-current discharge curve.

FIG. 5 shows a schematic circuit diagram of the fuel cell and the battery connected in parallel with the load, which is the heart pump "motor," and, optionally, the fan. The fuel cell impedance is designated as $Z_{FC}$, the impedance of the battery is identified as $Z_B$ and the load impedance is $Z_L$.

The operating mode of the hybrid system is as follows: at operating points to the left of point A which represents the crossing of the fuel cell voltage current discharge curve 51 with the battery charging curve 52, the fuel cell will recharge the battery. For convenience we term this the idle region. The voltage at A is the amount A', the same as the open circuit voltage of the hybrid system, as can be seen by drawing a line parallel to the current axis to intersect the voltage axis. At point B on the system discharge curve, having potential level B', the fuel cell will supply part of its current to the load and the remaining part to the battery. At operating point C, potential level C', the battery is no longer charged by the fuel cell. At point D, having potential level D', the current drawn from both the fuel cell and the battery goes only to the load. At the operating point E, having potential level E' and being the battery-fuel cell "cross-over" point, the contribution of the fuel cell and the battery are equal. Beyond this crossover point in terms of increased current draw, the battery will contribute more to the load requirement then the fuel cell. The various potential levels A' - E' corresponding to variable load characteristics from the pump and, optionally, the fan. Below the voltage potential value C' the battery component is a worker in the system, but at no time does it "charge" the fuel cell component. The fuel cell battery hybrid system voltage current discharge curve 54 can be seen to be the sum of the current values of the curves 53 and 51. Note that above the voltage level C' the current of curve 52 is negative, that is, the battery is being charged by the fuel cell. At a potential level corresponding to condition D, an amount d of the current is delivered by the battery, but the greater part d' is delivered by the fuel cell.

The battery in the hybrid power source for the artificial heart has 3 major functions: 1) to provide the peak instantaneous power required during systolic contraction; 2) to provide increased average power demand during periods of strenuous activities; and 3) to provide emergency power in case of fuel cell failure.

Another advantage of the hybrid system is the reduced size of the fuel cell needed. Without the battery to take the peak demand, the fuel cell would have to be designed sufficiently large to provide all peak demands. This would have the effect of increased volume and ciency of the proposed isotope-"prime mover" system of the prior art. The total heart rejection rate of the fuel cell-storage battery power source hybrid system is about 10 watts. This figure includes the heat loss of the motor-heart pump device. The heat is rejected to the blood stream and is well within the acceptable rate considering the comparable heat loss of the replaced natural heart. Within the above specifications, either nickel-cadmium or silver cadmium storage batteries may be used. While present designed silver-zinc batteries do not appear suitable, improvements in technology of such batteries may make them suitable for future inclusion in the hybrid system.

Figure 1:
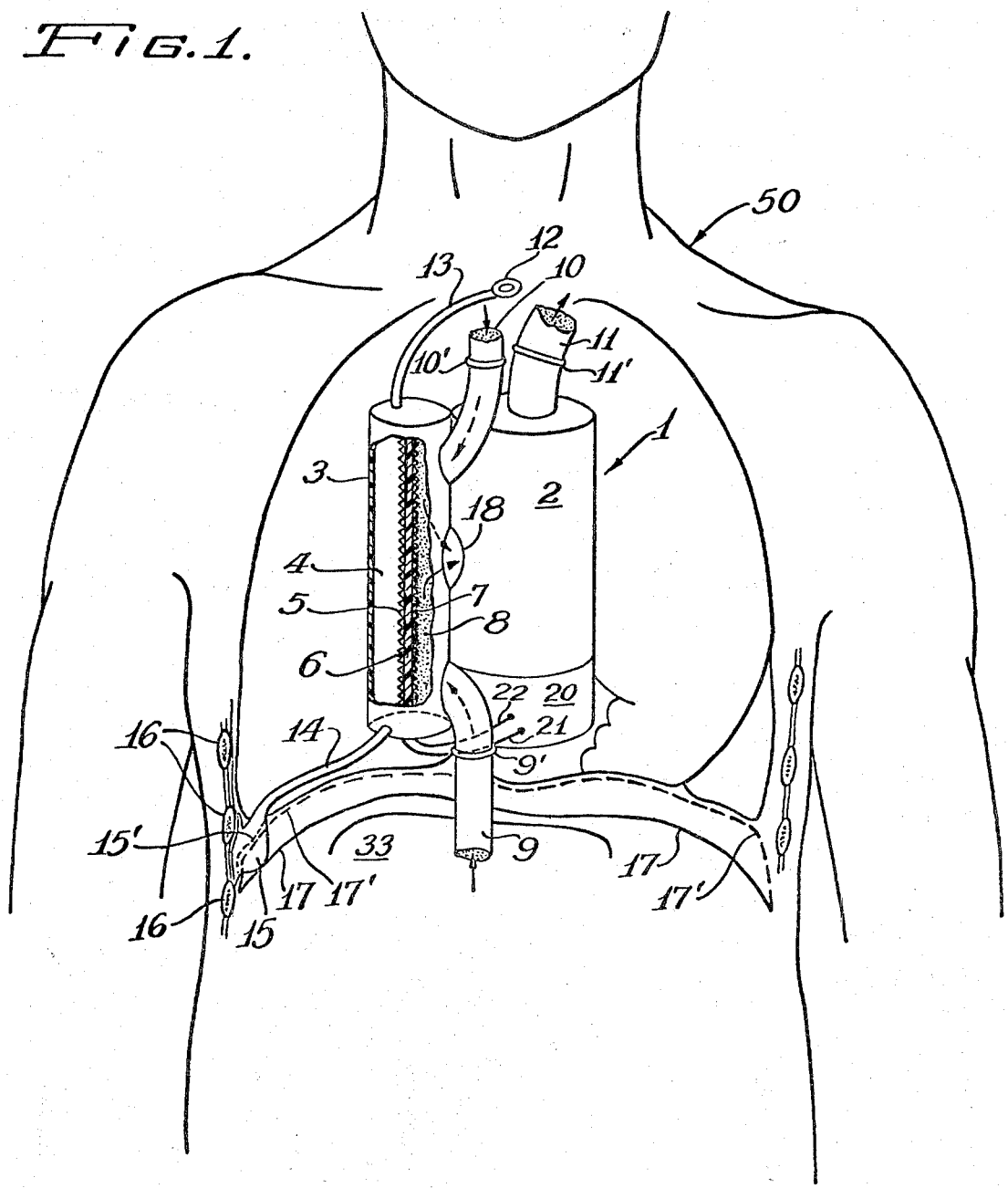
FIG. 1 shows schematically the general placement of the fuel cell-heart pump prosthesis combination in the thoracic cavity, and illustrates one placement of the percutaneous airway and balloon as connected to the cathode cavity.

FIG. 1 shows the placement of the hybrid system in combination with the heart pump. Totally implanted into the thoracic cavity of patient 50 is the power source-heart pump system 1 which comprises fuel cell 3, battery 20 and heart pump 2, the latter including a pump and "motor." The fuel cell 3 consists of the following basic parts: Cathode (air) chamber 4, cathode 5, electrolyte 6, which advantageously is an ion exchange membrane, or an acid or alkaline solution isolated from the body fluids, anode 7, anode chamber 8, and leads 21 and 22 from the anode and cathode, respecitvely, to the battery 20. Other leads (not shown in FIG. 1) interconnect the "motor" of the heart pump, the battery and the fuel cell in the manner best shown in FIG. 5.

In one embodiment, the fuel cell utilizes as anode fuel glucose or other carbohydrates in the bloodstream. As seen in FIG. 1, the superior vena cava 10 is sutured at 10' to a silastic covered dacron tube which leads into the anode chamber 8. Likewise, the inferior vena cava 9 is sutured at 9' to a tube which also leads into the anode chamber as shown by the arrows. After separation of the glucose from the blood by a suitable polymer membrane and passing thence in contact to the anode, the glucose is oxidized, and oxidation products pass back into the blood. The blood then passes into the heart pump prosthesis via aperture 18 shown schematically in FIG. 1. In the alternative the anode chamber may be equally well located in some other venous flow path, such as the pulmonary artery outflow from the right side of the heart before the venous blood passes through the lung.

The blood is then pumped by suitable heart pump and "motor" mechanism through the aorta 11 sutured to the silastic covered dacron tube leading from the heart pump at 11'. Any suitable heart pump and "motor" mechanism may be utilized, the particular type of heart pump and "motor" used not being critical except as it meets the power conversion specifications set forth above, and is otherwise compatible to the blood, i.e., satisfies criteria for a low percentage of mechanical or chemical (hemolytic) damage to the blood during the pumping action. Likewise, criteria for the blood pressure cycle and pumping output must be met.

Specifications for pumps and types which may be used are reviewed in many publications. For example, see the articles by E. Bernstein et al, "Prolonged Mechanical Circulatory Support: Analysis of Certain Physical And Physiological Considerations," appearing in Surgery, Vol. 57, No. 1 (January, 1965) pages 103–122; N. Lindgren, "The Artificial Heart — Exemplar Of Medical -Engineering Enterprise," appearing in the I.E.E.E. Spectrum, Vol. 2, No. 9 (September, 1965), pages 67–83. In addition, electrical motor powered artificial hearts are shown in the U.S. Pats. to Fry et al, 2,917,751 and 3,152,340. A pendulum-type of pump is shown in an article by W. Kolff entitled "An Artificial Heart Inside The Body" appearing in Scientific American, Vol 213, No. 5 (November, 1965) pages 38–46. The Kolff Article also reviews an electromagnetic heart pump using solenoid pistons actuated by an electrical power supply, which pump appears to be the subject of U.S. Pat. No. 3,048,165 to Norton. An electromagnetic pump of the Faraday type is disclosed in U.S. Pat. No. 3,206,768. We prefer to use the sac-type pump, an example of which is disclosed in the Kolff article, in which the pumping fluid is internal and energized by an electrically driven pumping mechanism.

As can be seen from FIG. 1, the fuel cell 3 of our invention employs an air-breathing cathode and a pore construction, more fully described and claimed in our co-pending application, Ser. No. 857,321, filed Sept. 12, 1969. One embodiment of the air-breathing cathode is shown in FIG. 1 and comprises one or more pores or openings 12 in the integument which is located so as to have free access to the outside air, a means of propelling the air from the outside to the desired interior location within the body, and a system of tubes or ducts connecting the pores and the propelling means with the cathode chamber itself. Just as the artificial heart and its pump are encased in a biologically acceptable plastic, for example a silicone rubber, tissue contacting parts of the air-breathing assembly, fuel cell, and storage battery are constructed of or coated with such material.

AIR-BREATHING ASSEMBLY

Two basic system types are disclosed herein, one utilizing a self-expanding balloon or bladder actuated by the motion of the diaphragm much in the manner of a bellows, and the second involving a mechanical blower located within the fuel cell unit itself. Both systems require a similar type of skin pore described in the aforesaid co-pending application Ser. No. 857,321. As seen in FIG. 1, the opening may be located at the base of the neck which is an area that can be kept open to the atmosphere in the manner commonly done with permanent tracheostomy or laryngectomy patients. The pore may be adapted to be placed in any convenient location, and where necessary or desired, the pore can be moved or revived from time to time.

BALLOON TYPE

The plastic pore is sutured to the integument and extends inwardly to connect with a tube 13 to the cathode space 4. From the lower end of the cathode space a second tube 14 extends into connection with a balloon or bladder which serves as a means of propelling air from the outside into the cathode space. As seen in FIG. 1, the balloon is relatively small, being on the order of 100 to 300 ml. in size. In the embodiment of FIG. 1, the balloon is placed advantageously in the costophrenic angle, that is, between the diaphragm 17 and the parietal pleura, interior of the ribs 16, at the most dependent recess of the thoracic cavity. During inspiration, the balloon is expanded to full size as shown in FIG. 1 in solid lines by the diaphragm 17 being at its lowermost position. Upon expiration, the diaphragm rises to position 17' thus compressing the balloon to the size shown in dotted lines and identified with the numeral 15'. The weight and also increase the anode fuel consumption rate.

The peak instantaneous power requirement arises from the pulsating nature of the heart's pumping mechanism. During the systolic contraction, the power is built up to a peak. The ratio of this peak power to the average power varies from 2 to 3. During periods of strenuous activities such as running, climbing stairs, etc., the average pumping demand on the heart is increased. For example, the heart of a normal 50 year old person produces just over 1 watt at rest. This output increases to about 4–6 watts at maximum power when the person is running hard. At such maximum power condition the battery will assist the fuel cell in providing the total require-ment of the artificial heart pump.

A very important feature is the redundancy capability of the hybrid power system. In case of failure of the fuel cell unit, the artificial heart can be sustained by the battery alone until the patient can be transferred to a hospital for emergency replacement of the defective fuel cell. Depending on the battery used, the redundancy safety time may be on the order of 10 hours without requiring excessive battery size or capacity.

Another important advantage for the use of a battery hybridized to the fuel cell arises as a result of the fact that the blood carbohydrate using fuel cell operates in equilibrium with the body fluids and the electrolyte is a buffered plasma ultrafiltrate having a pH of 7.4. Two basic problems arise from the use of a neutral electrolyte as opposed to acid or alkaline electrolyte used in conventional fuel cells. First, in neutral solutions oxygen electrode kinetics are considerably less rapid than in acid or alkali. The log of the reaction rate falls off linearly as pH increase at the acid end of the pH spectrum, and increases with increasing pH at the alkali end of the spectrum. In consequence, the rates at pH 1 and 13 are approximately equal; the rate in the neutral range is on the order of two decades or more lower. Second, in neutral solutions it is very difficult to maintain a low product concentration gradient at practical reaction rates even in concentrated solutions of what are normally considered to be good buffers. The buffering capacity of such solutions — that is, their ability to compensate changes in pH and prevent concentration gradients of $H^+$ and $OH^-$ across the cell — is vastly inferior to that of strong acid or alkaline solutions. The pH changes across the cell cause potential differences on the order of 61 mV per pH unit at 37° C.

The practical consequence of the resultant [$H^+$] and [$OH^-$] gradient across the cell is very slow response to load changes. Unlike conventional acid or alkaline fuel cells which can cope with fluctuating loads, the neutral fuel cell is slow in recovering from intermittent high load demands. If such a fuel cell is continuously subjected to such fluctuating operating conditions, it will deteriorate. Thus, we limit the operating load range of the carbohydrate-utilizing fuel cell to a substantially constant value, or to a narrow band. The battery, hybridized to the fuel cell, satisfies the peak load power and permits narrow band fuel cell operation.

The silver-cadmium type battery is preferred in our hybrid since it combines the long life of nickel-cadmium battery and the high capacity of silver-zinc battery.

Typical performance characteristics of the silver-cadmium type battery are given below in Table 2.

TABLE 2

Battery Characteristics

| | |
|---|---|
| Capacity, Watt-hr/lb | 30–34 |
| Capacity, Watt-hr/in$^3$ | 1.8–2.9 |
| Open Circuit voltage, volt | 1.4 |
| Operating voltage, volt | 1.1 |
| Operational life, cycles | 7000 (partial discharge) |
| Operational life, years | 2–3 |
| Time required until capacity loss reaches 50%, years | > 2 |

The operational life has been conservatively estimated and may prove to be substantially longer since the hybrid system permits only a relatively shallow discharge of the battery, thus tending to extend the battery lifetime.

While any conventional or presently used cathode or anode structure and catalytic coating may be used in the fuel cell part of our invention, we prefer to use the materials and structural arrangement set forth in our copending application Ser. No. 857,322, filed on Sept. 12, 1969 and directed to an implantable fuel cell (Case No. 69,441), the disclosure of which is herewith incorporated by reference for purposes of the combination disclosed herein.

Briefly, the air-breathing fuel cell of our copending case utilizes a platinum cathode and has a total cathode air ventilation flow of about 14 ml. per second for a 200 cc. balloon volume with a polarization of 400 mV (theoretical OCV about 1.2 V). The anode may be of rhodium, platinum-ruthenium alloys, or gold fiber felt coated with rhodium black catalyst powder, and supports a current density of from at least 30uA/sq. cm. to 0.02 amps/projected sq. cm., depending on roughness factor without poisoning. The glucose electrode thus may operate at an overall polarization of about 200 mV. The anode is separated from venous blood by a 0.1 mil thick membrane having a pore size of about 20 A and 50 percent porosity. With only 450 mV at 4 mA/sq. cm. as the working voltage, a power of 4.5 watts is available from such a cell having an electrode area of 3000 sq. cm. The configuration disclosed in our copending application yields a cell of total volume of about 1200 cc. (about 3.8 cm. × 15 cm. × 20cm.) weighing empty about 600 gm. ( 1.3 lbs.).

Overall dimensions for the cell of about 7.5 cm. × 7.5 cm. × 20 cm. are permissible within the volume available in the thoracic cavity. In contrast, projected volumes and weights of an equivalent fuel cell utilizing a blood deoxygenator as proposed in the Drake et al., report supra, for the same current density and terminal voltage, is estimated to be approximately 3 lbs., and have a volume approaching 3 liters.

Thus, while the specific fuel cell construction of our copending application is presently preferred for incorporation in the systems of this invention, other implantable fuel-cells may be used in our invention within the spirit thereof as set forth above, Similarly, within the spirit of our invention, other modifications and equivalents may be designed.

We claim:

1. A hybrid power source system supplying electrical energy to an implantable prosthesis acting as an electrical energy load comprising:

a. a fuel cell,
 b. a storage battery, c. an implantable prosthesis acting as an electrical energy load,
d. means electrically connecting said storage battery and said fuel cell in parallel with each other and with said load, and
e. said system is adapted to be totally implanted in an animal body, whereby said system permits efficient operation of said fuel cell at more nearly steady-rate conditions with high redundancy capability, rapid response to peak power output, and decreased size.

2. A hybrid power source system as in claim 1 wherein: said fuel cell has an air-breathing cathode assembly including a percutaneous airway employing an unhindered pore.

3. A hybrid power source system as in claim 1 wherein: said implantable prosthesis is an implantable artificial heart pump system having a pump mechanism.

4. A hybrid power source system as in claim 2 wherein:
said hybrid system and said heart pump are integrated in a single unit.

5. A hybrid power source system as in claim 2 which includes:
a means for ventilating said cathode assembly by producing a flow of air through said pore and airway, and
said hybrid system supplies electrical energy to power said ventilating means.

6. A hybrid power source system as in claim 1 wherein: said fuel cell includes means for separating reactive organic compounds as anode fuel from the blood of said animal.

7. An implantable hybrid power source system as in claim 3 wherein:
a. said fuel cell has a cathode assembly and balloon means adapted for volumetric change to effect transfer of air from the exterior of the body in which said system is adapted to be implanted to said cathode assembly, and
b. said balloon is disposed in association with the pumping mechanism of said implantable artificial heart pump mechanism so that actuation of said pump mechanism effects volumetric change in said balloon.

8. An implantable hybrid power source system as in claim 7 wherein said heart pump mechanism includes a sac-type heart, and said balloon forms at least a portion of said sac.

9. A hybrid power source system as in claim 1, which includes a physiologically acceptable housing enclosing said storage battery, fuel cell and prosthesis, the exterior surface of said housing including a material which does not cause hemolysis.

10. A hybrid power source system as in claim 1 wherein the fuel cell includes a cathode assembly having means adapted to utilize oxygen present in air supplied thereto.

11. An integrated power and heart pump system as in claim 4 wherein:
a. said heart pump includes an atria or blood collecting plenum, and
b. the fuel cell includes an anolyte chamber disposed in connection with said plenum.

12. An integrated power source and heart pump system as in claim 4 wherein:

a. said heart pump includes a right ventricle chamber having an outflow passage, and
b. the fuel cell includes an anolyte chamber disposed in connection with said outflow passage.

13. A method of powering a prosthetic device implanted in the body of an animal comprising:
a. connecting a hybrid power system in parallel electric circuit with said prosthetic device, said hybrid power system comprising a first electrical power source and an electrical storage battery connected in parallel electric circuit,
b. supplying energy to said prosthetic device from said hybrid power system in response to the power load demand of said device,
c. maintaining said energy supply from said first power source during average prosthesis power load demand,
d. increasing said energy supply to said prosthesis upon peak power load demand by current draw from said storage battery in addition to said first power source, and
e. recharging said electrical storage battery by electrical power output from said first power source during periods of low prosthesis power load demand, whereby said prosthesis is operable over increased power load demand ranges, and is protected from stoppage by failure of one power source by the redundancy capability of said hybrid power system.

14. A method as in claim 13 wherein said first power source is a fuel cell.

15. A method as in claim 14 wherein said fuel cell is operated at substantially ambient temperature.

16. A method as in claim 15 wherein said hybrid power system is adapted for implantation into said animal body.

17. A method as in claim 16 wherein said hybrid power system and said prosthesis is integrated into a single unit.

18. A method as in claim 13 wherein said prosthetic device is a heart pump.

19. A method as in claim 16 wherein said prosthetic device is a heart pump.

20. A method of powering a prosthetic device implanted in the body of an animal as in claim 14, wherein said fuel cell has an anode and a cathode, and includes the steps of:
a. supplying fuel to the anode of said fuel cell, and
b. ventilating the cathode of said fuel cell with external air to supply said cathode with oxygen.

21. A method as in claim 20 wherein said step of cathode ventilation includes the added steps of:
a. passing air through a percutaneous airway via an unhindered pore into contact with said cathode,
b. exhausting said air at least periodically from said cathode.

22. A method as in claim 21 wherein said step of exhausting is continuous.

23. A method as in claim 21 wherein said step of exhausting includes passing said air through a second percutaneous airway and pore assembly in a one-way flow pattern.

24. A method as in claim 20 wherein said step of supplying fuel to said anode includes the added steps of:
a. separating reactive organic compounds from the blood stream of said animal, b. passing said organic compounds into contact with said anode whereby they react to provide a source of electrons for said fuel cell,
c. removing reaction products from said anode and passing them into said blood stream.

25. A method as in claim 24 wherein said anode fuel reactive compound is glucose.

* * * * *

PO-1050
(5/69)

UNITED STATES PATENT OFFICE
CERTIFICATE OF CORRECTION

Patent No. 3,774,243                     Dated November 27, 1973

Inventor(s) Daniel Y. C Ng; Sidney K Wolfson, Jr.; Anthony J. Appelby

It is certified that error appears in the above-identified patent and that said Letters Patent are hereby corrected as shown below:

The assignee of this patent is the Institute of Gas Technology, a corporation of the State of Illinois.

Signed and sealed this 30th day of April 1974.

(SEAL)
Attest:

EDWARD M. FLETCHER, JR.
Attesting Officer

C. MARSHALL DANN
Commissioner of Patents